United States Patent Office 3,274,062
Patented Sept. 20, 1966

3,274,062
DIAGNOSTIC REAGENT
Kingdon Lou, North Hollywood, Calif., assignor to
Hyland Laboratories
No Drawing. Filed Aug. 20, 1963, Ser. No. 303,421
4 Claims. (Cl. 167—84.5)

This invention is concerned with methodology for concentrating cholesterol rich protein constituents of normal blood serums without appreciably altering the concentrations of the normally present non-cholesterol consitituents. This invention is also concerned with blood serum standards which contain abnormally high levels of cholesterol containing constituents but which contain the normal levels of all of the non-cholesterol containing constituents.

In recent years the quantitation of cholesterol in serum has assumed an increased clinical significance. Many clinicians believe that there may be a direct relationship between elevated serum cholesterol and the incidence of vascular difficulties, such as atherosclerosis. This belief has resulted in a significant increase in the frequency of routine cholesterol determination, which in turn has prompted the need for test procedures which facilitate the ease and rapidity of making such determinations, without sacrifice of sensitivity or accuracy.

Normally, only excessively high serum cholesterol levels are of clinical significance. The diagnostician wants to know whether his patient has either normal or excessively high serum cholesterol levels. Although there is no substantial medical accord on what constitutes an excessively high cholesterol level, in general, 100 to 250 milligrams percent of measurable cholesterol can be said to represent the "normal" or "non-elevated" range for most age groups. Cholesterol levels in excess of about 250 milligrams percent are considered by many to be sufficiently high as to warrant medical or dietary steps to effect a lowering.

Reliable results in any chemical analytical determination are dependent upon the continuous evaluation of the test procedure, equipment and reagents being employed. This can best be accomplished through the concurrent use of controls, such as the analysis of "standards." These controls or standards contain known amounts of the material being analyzed, as for example, cholesterol. The necessity for adequate controls is especially important in cholesterol determination because of frequently reported discrepancies between various analytical laboratories. Since several methods of cholesterol determination are in routine use, some of which possess the inherent possibility of errors attributable to the instability of reagents or of resulting colors, a suitable control is especially useful.

Control serums which contain cholesterol levels in the normal range are readily available. Such "normal controls" can be obtained in large quantities by simply pooling the serums from a number of cholesterol-normal serums. However, until the genesis of the instant invention, there had not been available a "high cholesterol control" in a physiologic state. Such a high cholesterol control will contain more than 300 milligrams percent of cholesterol. Such a high cholesterol control contains the normal levels of the non-cholesterol containing constituents of serum and is, therefore, analogous to the serum of individuals with elevated cholesterol levels. One cannot obtain high cholesterol controls in a physiologic state simply, for example, by concentrating whole serum and by adding this concentrate to normal serum. Although the resulting composite would contain a higher-than-normal cholesterol level, it would also contain a higher-than-normal level of the non-cholesterol containing constituents (e.g. inorganics and certain carbohydrates and proteins) of serum.

Reference has been made herein to the cholesterol-containing constituents of serum rather than to cholesterol. This is because cholesterol does not appear, as such, in serum. Cholesterol is soluble only in organic solvents. Therefore, cholesterol in serum always appears in combination with some substance which can solubilize it in an aqueous medium. Most frequently these solubilizing substances are proteins. The physiologic state of cholesterol in serum, consequently, is in combination with protein, principally as a so-called beta-lipoprotein.

Heretofore, it has not been considered feasible to prepare a high cholesterol control by adding beta-lipoproteins to normal serum. The beta-lipoproteins are extremely unstable, and attempts to precipitate them from serum normally result in irreversible denaturation of the protein. The consequence is either the splitting-off of water-insoluble cholesterol or the formation of a water-insoluble cholesterol-protein precipitate. In spite of its water-insolubility, cholesterol has been used for the obtention of high cholesterol controls. This is because of the clinical need for such controls and the fact that no reasonable expedient exists. A high cholesterol control of this nature has a number of obvious disadvantages. Because of the insolubility of the cholesterol in the serum, the control must be both heated and vigorously agitated in an attempt to obtain a uniform suspension-type dispersion of the cholesterol. Such procedures require special equipment and are time-consuming; the results are, at best, only moderately accurate and are reproducible with limited reliability.

An object of this invention is to provide a methodology for the preparation of a high cholesterol control for analytic purposes.

A further object is to provide a high cholesterol control in which substantially all of the cholesterol is present in a physiologic state.

Another object is to provide procedures for the preparation of physiological beta-lipoprotein which is soluble in serum and which, therefore, is suitable for use as a principal constituents of a high cholesterol control.

Yet another object is to provide a high cholesterol control in which all of the constituents are present in a physiologic state.

A further object is to provide a high cholesterol control which is substantially devoid of insoluble non-physiologic cholesterol and which, therefore, does not require heating and vigorous agitation before use.

Other objects and advantageous features will become apparent from the following detailed description and the illustrative examples.

In accordance with the practice of this invention, a high cholesterol control is prepared by adding to a serum of non-elevated cholesterol content a sufficient quantity of the physiologic beta-lipoprotein preparation of this invention to raise the cholesterol level of the serum to the desired elevated level. The physiologic beta-lipoprotein preparation of this invention is achieved by precipitation and collection of the beta-lipoprotein fraction of serum through the use of calcium ions and a polyanionic precipitant.

The polyanion precipitation of beta-lipoprotein has been characterized in publications appearing at J. Physiol. Paris, 49: 83–86, 1957, and The Am. Jour. of Clin. Path., 35, No. 3, 222–226, 1961, and Proc. Soc. Exptl. Biol. and Med., 104, No. 1, 618–620, 1960. These publications are concerned with methods of quantitating serum beta-lipoproteins. Therefore, for the purposes of the references, it was not required that the beta-lipoprotein be undenatured. In fact, the procedures employed were intended to be quite severe in order to insure complete precipitation of all of the beta-lipoprotein which was present in the serum, and the presence of absence of denaturation did not affect the purpose to be served. In the practice of the present invention, the conditions employed must be such that substantially no denaturation occurs, and total precipitation of the beta-lipoprotein is not, therefore, an essential criterion.

Polyanionic precipitants which can be employed must have characteristics such that the resultant precipitate is dissolvable in serum. That is, the insolubility must be reversible. Many polyanions do not exhibit this desired characteristics. The sodium salt of sulfated polygalacturonic acid methyl ester methyl glycoside (hereinatfer rererred to as Mepesulfate), however, is quite satisfactory. The presence of calcium ions is essential to the successful use of Mepesulfate. The calcium ions can be contributed by water soluble calcium salts such as calcium acetate or calcium chloride.

The combination of Mepesulfate and calcium ions is the preferred beta-lipoprotein precipitant in the instant invention. It has been found that 0.06 mole of calcium ion and 7 milligrams of Mepesulfate per milliliter of serum results in optimum precipitation of beta-lipoprotein. Calcium ion concentrations of from about 0.04 mole to 0.25 mole per milliliter of serum and quantities of Mepesulfate of from 2.0 milligrams to 8.0 milligrams per milliliter of serum produce satisfactory precipitation of beta-lipoprotein for the practice of the instant invention. It is understood that the more digression there is from the optimum calcium concentration, within the above expressed ranges, the less digression there should be from the optimum Mepesulfate concentration. Also, the more digression there is from the optimum Mepesulfate concentration within the above expressed ranges, the less digression there should be from the optimum calcium concentration.

The practice of the present invention is further illustrated by reference to the following detailed example.

*Example*

The high cholesterol control serum of this invention is prepared from ACD plasma as follows.

To four liters of ACD plasma (cholesterol content 160 milligrams percent) in a 37° C. water bath is added one liter of 12% calcium acetate monohydrate solution with gentle agitation, and the admixture is permitted to reach ambient temperature. Since, in this example, plasma is employed as the starting material, it is necessary to remove the fibrin. If serum were the starting material, fibrin removal, of course, would have previously been effected. There are added, therefore, stat and with stirring, 8000 units of thrombin; to thereby cause the plasma to clot rapidly into a firm gel. To insure complete clotting the admixture is incubated at 37° C. for 30 minutes. The clot is physically disrupted with a knife and the resultant is frozen until sufficient time is available for the remainder of the work up.

Upon subsequent thawing, the fibrin is removed by filtration through cheesecloth. To the filtrate is added one liter of a 4% solution of Mepesulfate (the sodium salt of sulfated polygalacturonic acid methyl ester methyl glycoside), and the admixture is then stored at 5° C. overnight. The resultant is centrifuged in the cold for 75 minutes to pack the beta-lipoprotein. The supernatant is discarded and the precipitate resuspended by the addition of 150 ml. of cold (0.9%) saline. This admixture is then dialyzed against normal saline overnight at +5° C. using Visking tubing 1⅛ inches wide and 30 inches long. The suspension removed from the dialyzing bags and pooled normal serum (containing 200 milligrams percent cholesterol) is added to make a final volume of 2000 ml. The final product thus formed has a cholesterol content of 400 milligrams percent. This high cholesterol control is then stored until needed.

While in the foregoing specification, a detailed description of embodiments of the invention has been set forth for the purpose of illustration, it will be apparent to those skilled in the art that many modifications in the details of these embodiments may be made without departing from the spirit and principles of the invention.

What I claim is:

1. A method for the manufacture of a high cholesterol control standard for diagnostic use comprising the steps of:
    (a) Adding calcium ions to a serum of non-elevated cholesterol content.
    (b) Adding further to said serum a water soluble salt of a sulfated poly-galacturonic acid methyl ester methyl glycoside.
    (c) Collecting the resultant precipitate of beta-lipoprotein and purifying said precipitate by dialysis.
    (d) Dissolving said precipitate in a serum of non-elevated cholesterol content to thereby form a physiologic serum of high cholesterol content.

2. A method for the manufacture of a high cholesterol control standard for diagnostic use comprising the steps of:
    (a) Adding to a serum of non-elevated cholesterol content from about 0.04 to about 0.25 mole of calcium ions per milliliter of serum and from about 2.0 to 8.0 milligrams of a water soluble salt of a sulfated poly-galacturonic acid methyl ester methyl glycoside per milliliter of serum.
    (b) Collecting the resultant precipitate of beta-lipoprotein and purifying said precipitate by dialysis.
    (c) Dissolving said precipitate in a serum of non-elevated cholesterol content to thereby form a physiologic serum of high cholesterol content.

3. A method for the manufacture of a high cholesterol control standard for diagnostic use comprising the steps of:
    (a) Adding to a serum of non-elevated cholesterol content about 0.06 mole of calcum ion per milliliter of serum and about 7 milligrams of the sodium salt of sulfated polygalacturonic acid methyl ester methyl glycoside per milliliter of serum.
    (b) Collecting the resultant precipitate of beta-lipoprotein and purifying said precipitate by dialysis.
    (c) Dissolving said precipitate in a serum of non-elevated cholesterol content to thereby form a physiologic serum of high cholesterol content.

4. The method of claim 3 in which the said serum of non-elevated cholesterol content has a cholesterol content of less than 250 milligrams percent and the physiologic serum of high cholesterol content has a cholesterol content of more than 300 milligrams percent.

No references cited.

LEWIS GOTTS, *Primary Examiner.*

SHEP K. ROSE, *Assistant Examiner.*